Patented Jan. 21, 1947

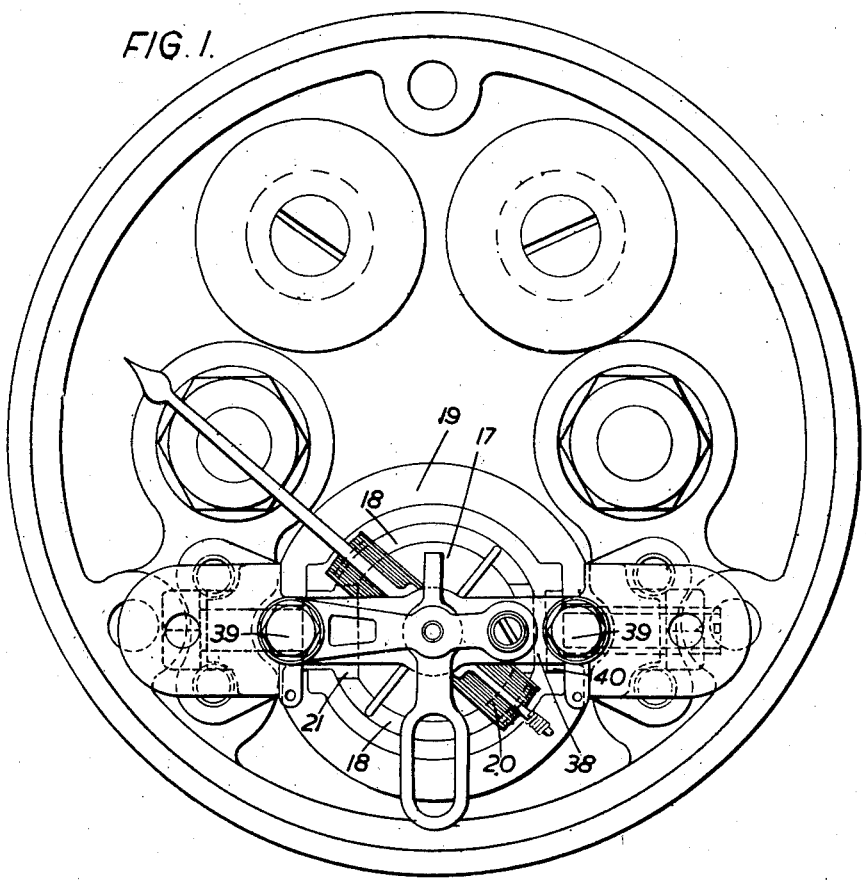
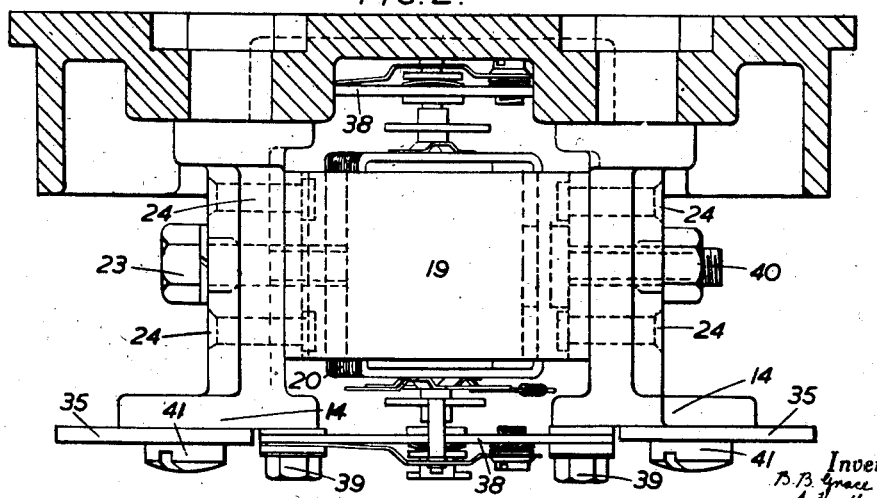

2,414,462

UNITED STATES PATENT OFFICE 2,414,462

PROCESS OF MANUFACTURING AND ASSEMBLING ELECTRICAL MEASURING INSTRUMENTS

Bertram Barnett Grace, John Handley, and Gilbert Gilliver, London, England, assignors, by mesne assignments, to International Standard Electric Corporation, New York, N. Y., a corporation of Delaware Application June 12, 1943, Serial No. 490,627
In Great Britain July 17, 1942

1 Claim. (Cl. 29—155.59)

This invention refers to a process of manufacturing and assembling electrical measuring instruments of the moving coil type in which the permanent magnet is situated within the moving coil and is held in a cradle formed by a pair of diametrically opposite pole shoes which are brazed to a pedestal, the pedestal being located in a ring of magnetic material which surrounds the magnet-and-pole-shoe assembly and completes the magnetic system.

The invention consists in providing a rigid construction and assembly including means for carrying the bearings, control springs and scale plate, and in mounting facilities for supporting the mechanism with a minimum of extra weight, and also in making the mechanism more open and accessible, by riveting two small die castings diametrically opposite on the surrounding ring, thus giving the ring a dual purpose of providing a return circuit for the magnetic flux and of being the main part of the supporting frame.

It also provides a construction which allows of the permanent magnet being magnetized after the mechanism has been completely assembled.

The invention further consists in providing a magnetic shunt to adjust the instrument accurately to a given deflection during manufacture or at any time later should the magnet vary in strength.

The invention also consists in adapting for use as a central magnet, a permanent magnet of very high magnetic energy per unit volume (an advantage gained by heat treating the magnet in a magnetic field, necessitating it being magnetized in the same direction for efficient use after assembly), and where the magnet is cylindrical in shape and magnetized diametrically, a means such as one or more flat sides for indicating the direction of magnetization and a projection or a flat in the magnet holder or housing to insure it being located at the correct angle.

The invention will now be described with reference to the accompanying drawing in which:

Fig. 1 is a front view with cover and scale removed:

Fig. 2 is a top plan view with the base or rear cover shown in section on the centre line:

The framework of the mechanism consists of a ring-shaped-pole-piece 19 to which two die cast supports 14 are rigidly attached by rivets 24.

The central permanent magnet 17 is cylindrical in shape but with a flat on one side and it is fitted within a cradle comprising a pedestal 21 and a pair of diametrically opposite pole shoes 18 the pedestal being adjacent to the flat on the magnet and insuring that the magnet is assembled in a definite angular position. When assembled the magnet is magnetized across its diameter, the magnetic axis being parallel to the flat and corresponding to the direction of the magnetic field in which the material was heat treated during manufacture. The magnet and pole shoe assembly is held in the ring by the pedestal, which is located in one of the recesses in the ring and secured by the screw 23.

The outer ring 19 is concentric with the magnet and its pole pieces, so that an arcuate air gap is formed between them with the centre of the two opposite arcs coincident with the axis of the cylindrical magnet.

The moving coil 20 is of rectangular shape embracing the magnet so that its opposite sides swing in the air gap on its pivots which are coincident with the geometric axis of the magnet and cylinder.

The pivot bearings, control springs and adjusters are mounted on the two bridge pieces 38 which are attached to the framework by the screws 39. The bridge pieces are insulated from the frame by bushes and washers.

The open ends of the pole shoes 18 are extended towards one another at a reduced width and machined off flat on their extended portions. A short-circuiting screwed plunger 40 is provided to short circuit or shunt the magnetic flux from one pole shoe to the other and so reduce the flux density in the gap for the purpose of finally adjusting the deflection of the instrument.

The framework is attached to the base of the instrument by four screws which are screwed through the base into lugs on the rear end of the die castings 14.

The scale plate 35 is attached to lugs on the front of the die castings by screws 41.

The permanent magnet 17 is made from material having a very high BH max, where B is the remanence, H is the coercive force and BH max is the maximum product of these two values. The best of such materials at present known are alloys of aluminum, nickel and cobalt, which have been so heat treated in a magnetic field as to enable a much higher BH max to be obtained, when subsequently magnetized in the same direction. This gives a very high flux density in the arcuate air gaps between the pole shoes and the ring. One such permanent magnet material is sold under the trade name of Ticonal 42/50.

The proportions of the magnet system are so chosen that the magnet produces its BH max, a condition that is dependent on the relationship between—

| | |
|---|---|
| The cross sectional area of the magnet | S |
| The average length of the flux path in the magnet | L |
| The cross sectional area of the flux path in the gap | s |
| The combined length of the flux paths in the two gaps | l |
| And the leakage factor | f |

The proportions are then given by $$\frac{B}{H} = \frac{Lsf}{lS}$$

For Ticonal 42/50, BH max=$4.22 \times 10^6$ where B=8600 lines per sq. cm. and H=490 gilberts per cm. so that $$\frac{B}{H} = \frac{8600}{490} = 17.5$$

The dimensions of the magnet system therefore are so proportioned that $$\frac{Lsf}{lS} = 17.5 \text{ approximately}$$

The width of the air gap is no more than is necessary to accommodate the coil with working clearances (1.2 m/m.) The circumferential length of the gap is determined by the angular swing of the coil and pointer, and a suitable diameter and length of magnet and the leakage factor are calculated to give the correct ratio of B/H.

It will be understood that the invention may take other forms an example being that in which the magnetic flux is not to be uniformly distributed throughout the length of the gap, which may be attached by non-circular curvature of the poles or upstanding portions of the outer ring or by these surfaces being eccentric in relation to the axis of the magnet and pivots, and producing air gaps of varying widths.

What is claimed is:

Process of manufacturing and assembling an electrical measuring instrument of the type wherein a cylindrical centrally disposed permanent magnet is mounted upon a pedestal at a predetermined angle of rotation with respect thereto, including the steps of completely forming said magnet with a flat upon one portion of the periphery thereof, heat treating said preformed magnet while located in a magnetic field bearing a predetermined angular relationship to the position of said flat, mounting said magnet upon said pedestal so that said flat engages said pedestal and determines said predetermined angle of rotation with respect thereto, and magnetizing said magnet in situ, whereby the direction of said last magnetization can be predeterminedly made to accord with the direction of magnetization thereof during the step of heat treating.

BERTRAM BARNETT GRACE.
JOHN HANDLEY.
GILBERT GILLIVER.